(12) United States Patent
Morozumi et al.

(10) Patent No.: US 7,822,934 B2
(45) Date of Patent: Oct. 26, 2010

(54) MULTIPURPOSE SEMICONDUCTOR INTEGRATED CIRCUIT DEVICE

(75) Inventors: Akio Morozumi, Matsumoto (JP); Chiaki Segi, Matsumoto (JP); Yuji Nakamura, Nagano (JP)

(73) Assignee: T&D Corporation, Nagano (JP)

( * ) Notice: Subject to any disclaimer, the term of this patent is extended or adjusted under 35 U.S.C. 154(b) by 44 days.

(21) Appl. No.: 10/562,553

(22) PCT Filed: Jun. 30, 2004

(86) PCT No.: PCT/JP2004/009194

§ 371 (c)(1),
(2), (4) Date: Apr. 3, 2006

(87) PCT Pub. No.: WO2005/003980

PCT Pub. Date: Jan. 13, 2005

(65) Prior Publication Data

US 2006/0190529 A1      Aug. 24, 2006

(30) Foreign Application Priority Data

Jul. 1, 2003      (JP)      ............................. 2003-189643

(51) Int. Cl.
*G06F 12/00* (2006.01)
(52) U.S. Cl. ................... 711/163; 709/203; 709/225; 709/229; 710/62; 713/151
(58) Field of Classification Search ............ 710/62
See application file for complete search history.

(56) References Cited

U.S. PATENT DOCUMENTS 4,972,470 A * 11/1990 Farago ................. 713/192

5,404,528 A * 4/1995 Mahajan .................. 719/320

(Continued)

FOREIGN PATENT DOCUMENTS

EP      1324226 A1 *   7/2003

(Continued)

OTHER PUBLICATIONS

'The Safe-Tcl Security Model' by Ousterhout et al., copyright 1997, Sun Mircosystems, Inc.*

(Continued)

*Primary Examiner*—Henry W Tsai
*Assistant Examiner*—Steven G Snyder
(74) *Attorney, Agent, or Firm*—Buchanan Ingersoll & Rooney PC

(57) ABSTRACT

There is provided a multipurpose semiconductor integrated circuit device that can connect a variety of appliances to a network at low cost. The multipurpose semiconductor integrated circuit device includes: a plurality of types of input/output interfaces; a memory including a file storage region for storing a script file where processes relating to data inputted and/or outputted though the plurality of types of input/output interfaces are defined using a script language; an interpreter capable of executing the script files; and a file management system that admits accessing the file storage region of the memory thought at least one of the plurality of types of input/output interfaces. By defining user logic relating to input/output data using a script file, it is possible to clearly distinguish between firmware and user logic and user logic can be installed easily.

8 Claims, 6 Drawing Sheets

U.S. PATENT DOCUMENTS

| | | | | |
|---|---|---|---|---|
| 5,933,826 | A * | 8/1999 | Ferguson | 707/9 |
| 6,373,841 | B1 * | 4/2002 | Goh et al. | 370/389 |
| 6,438,666 | B2 * | 8/2002 | Cassagnol et al. | 711/163 |
| 6,628,325 | B1 | 9/2003 | Steinberg et al. | |
| 6,681,995 | B2 * | 1/2004 | Sukeda et al. | 235/492 |
| 6,880,083 | B1 * | 4/2005 | Korn | 713/170 |
| 6,881,096 | B2 * | 4/2005 | Brown et al. | 439/620.01 |
| 6,912,597 | B2 * | 6/2005 | Sasaki et al. | 710/1 |
| 6,954,850 | B1 * | 10/2005 | Howard et al. | 713/1 |
| 6,997,809 | B2 * | 2/2006 | Watanabe et al. | 463/42 |
| 7,133,845 | B1 * | 11/2006 | Ginter et al. | 705/51 |
| 7,631,198 | B2 * | 12/2009 | Thibadeau | 713/193 |
| 2001/0018707 | A1 * | 8/2001 | Seta | 709/218 |
| 2002/0059474 | A1 * | 5/2002 | Camara et al. | 709/321 |
| 2002/0086706 | A1 * | 7/2002 | Chen et al. | 455/560 |
| 2003/0061408 | A1 * | 3/2003 | Ayaki | 710/5 |
| 2003/0217126 | A1 * | 11/2003 | Polcha et al. | 709/220 |
| 2004/0133626 | A1 * | 7/2004 | Herrero et al. | 709/200 |
| 2005/0172094 | A1 * | 8/2005 | Goodwin | 711/163 |
| 2007/0209076 | A1 * | 9/2007 | Porter et al. | 726/25 |

FOREIGN PATENT DOCUMENTS

| | | |
|---|---|---|
| JP | 2002-328853 A | 11/2002 |
| JP | 2003-092787 A | 3/2003 |
| JP | 2003-099207 A | 4/2003 |
| JP | 2003-108539 A | 4/2003 |
| JP | 2003-518785 A | 6/2003 |
| WO | 00/01138 A2 | 1/2000 |

OTHER PUBLICATIONS

'Advanced Perl Programming' by Sriram Srinivasan, copyright 1999, O'Reilly & Associates.*

Form PCT/ISA/210 (International Search Report) dated Sep. 7, 2004.

Form PCT/IPEA/409 (International Preliminary Examination Report) dated Jun. 30, 2005.

* cited by examiner

Fig. 6

(a)
```
<HTML>
<H1>Temperature and Humidity of the resort</H1>
<HR>
Click on button for Current Temperature and Humidity
<FORM METHOD="POST" ACTION="ondo.cgi">
<INPUT TYPE="submit" VALUE="UPDATE" >
<FORM>

</HTML>
```
— 75

(b) ondo.cgi
```
$temp =get_ondo( ) ;
$hmdt= get_situdo( ) ;
```
— 76

(c)
```
<HTML>
<H1>Display Current Temperature and Humidity</H1>
<HR>
Current Temperature is $temp. <BR>
<BR>
Current Humidity is $hmdt.<BR>

</HTML>
```
— 75a

MULTIPURPOSE SEMICONDUCTOR INTEGRATED CIRCUIT DEVICE

This application is based on and claims priority to Japanese Application No. 2003-189643, filed on Jul. 1, 2003 and International Application No. PCT/JP2004/009194, filed on Jun. 30, 2004 designating the U.S., the entire contents of both of which are hereby incorporated by reference.

TECHNICAL FIELD

The present invention relates to a semiconductor integrated circuit device provided by a semiconductor chip or a chip set.

BACKGROUND ART

A system called a device server for connecting a device that only has a serial port to a computer network such as the Internet is known. For example, the vast majority of console ports that are provided on network appliances for making settings are serial ports. In Japanese Laid-Open Patent Publication No. 2002-328853, a serial port is connected via a device server to a network and a protocol is converted by the device server so that the console port of the network appliance can be accessed via the network and a parameter file can be set.

Although a device server has a function for converting a protocol and transferring data, the interface controller chip will differ depending on the protocol to be converted, and therefore it is necessary to use different device servers. For example, in Japanese Laid-Open Patent Publication No. 2002-328853, a mobile phone-compatible device server (DS) that is used to connect a mobile telephone and a serial port differs to a device server (DS) for connecting the Internet and a serial port.

SUMMARY

Serial ports or serial interfaces that can input and output serial data include a variety of types, such as RS-232C, USB, $I^2C$ made by PHILLIPS, and IEEE1394. To connect such interfaces to a computer network, it is necessary to convert different protocols. Also, aside from serial interfaces, there are also many demands to connect appliances and devices that only have a parallel interface, an analog interface, or a digital interface (hereinafter such appliances and devices are called target devices) to a network, and therefore a large amount of time and cost are required to develop device servers that are compatible with the various types of interfaces and various protocols.

Even if it is possible to simply access a target device from a computer terminal (PC) via a network, unless an application that can display and decode the data obtained from the target device is developed, it will not be possible to output or use the information from the target device. For example, when the target device is a digital camera, even if image data is obtained from the digital camera via the network, an application such as a viewer that can process the image data to display the image data will be required. In the case of a home page (HP) where images obtained from a digital camera are attached to an HTML file, although it will be possible to easily view images of the digital camera via a network if a web browser is operating, a device server alone does not have such function. Although the desired object may be achieved by connecting a digital camera to a computer network via a personal computer equipped with a function as a device server and also a function for generating an HP, when doing so, it cannot be said that the target device has been connected to the network easily and at low cost.

Now that the introduction of IPv6 is being considered, if it were possible to assign IP addresses to various appliances and to connect existing appliances or resources to a network easily and at low cost, it would be possible to further increase the additional value of such appliances and devices and realize a variety of services or businesses.

It is an object of the present invention to provide a device that makes it possible to connect a variety of appliances and devices to a network easily and at low cost. It is a further object to provide a device that makes it easy to view the output of a variety of appliances using a browser, for example.

The present invention provides a multipurpose semiconductor integrated circuit device that is equipped in advance with a plurality of types of input and/or output interfaces (referred to in this specification as input/output interfaces or input-output interfaces). In this specification, the expression "semiconductor integrated circuit device" is not limited to a single-chip semiconductor integrated circuit device such as a system LSI where a system including an embedded processor is mounted on a single semiconductor substrate, and also includes a chip set where a CPU, ASICs for interfaces, and ROM and RAM chips are combined, or a device including a module where such chips are combined in a single component. It should be noted that unless stated otherwise, a "chip" is not limited to a system LSI and is a concept that includes a chip set and also a module where a chip set is integrally mounted.

In this specification, the plurality of types of input/output or I/O interfaces are also referred to as a plurality of types of input-output interfaces and include at least one of interfaces for inputting, for outputting, and for inputting and outputting various types of data. In the same way, "input/output" is also referred to as "input-output" and indicates at least one of inputs, outputs, and input and output of data. Also, input/output interfaces may include physical parts such as connectors, but should preferably do not include any physical parts basically so that it can be provided as chips or modules and the interfaces can be used for multiple purposes. However, this does not mean that the plurality of types of input-output interfaces do not include a physical layer and it is possible to include logical parts included in the physical layer, for example, a protocol or modulating/demodulating method of a modem. However, in many cases, in the multipurpose semiconductor integrated circuit device included in the present invention, the various types of input-output interfaces include, out of the protocols defined by the standards of respective interfaces, a function that includes a data link layer and handles or processes data according to a protocol included on a higher level.

For example, the plurality of types of input-output interfaces include an ETHERNET (registered trademark) controller (MAC) capable of accessing a computer network (in this specification, simply "network"), a CF (COMPACT FLASH (registered trademark)) interface that is a card interface, a serial I/O interface, a USB-HOST interface, a USB-TARGET interface, a parallel I/O interface, an $I^2C$ bus interface proposed by PHILLIPS, an interface equipped with an A/D converting function and/or D/A converting function, and an interface equipped with an audio CODEC function.

By providing a semiconductor integrated circuit device where a large number of types of input-output interfaces are installed in advance, it becomes possible to use the semiconductor integrated circuit device for multiple purposes. For example, by connecting a connector that is a physical layer to the various types of input/output interfaces of the multipurpose semiconductor integrated circuit device, a device server can be easily arranged. By connecting connectors to a network interface of the multipurpose semiconductor device included in the present invention and also to an interface of another suitable type, it is possible to easily arrange a device server for connecting target devices that do not have network interfaces to a network. In addition, by connecting one of the plurality of types of input/output interfaces of the multipurpose semiconductor integrated circuit device to a target device either inside or outside the target device, and connecting a connector to another of the plurality of types of input/output interfaces, for example, a network interface, it is possible to provide a device with a network interface that includes the resources of a conventional target device in their present state.

In addition, by installing a plurality of types of input-output interfaces in the semiconductor integrated circuit device in advance regardless of whether such interfaces will be required, it becomes possible to mass produce the semiconductor integrated circuit device and therefore the hardware cost of the multipurpose semiconductor integrated circuit device can be sufficiently reduced.

In the multipurpose semiconductor integrated circuit device in which many types of input-output interfaces are installed in advance, even if it is possible to install function for handling data according to many types of protocols, it will not be possible to install all of functions for determining processing and/or operations between interfaces or to install all of the control logic required to do so in advance. If only a processing for transferring data between the serial interface and the TCP protocol of the network interface after protocol conversion is simply required, logic for performing such processing can be implemented as a sequencer, or stored in the ROM of the semiconductor integrated circuit device. However, much time and effort are required for imagining, defining, and developing a program for processes carried out between many types of interfaces, and there is always the possibility of the data processing method changing according to the target device or the processing method being changed by the user. Accordingly, it is not possible to install functions on an application layer in advance.

On the other hand, generating and updating the firmware installed or to be installed in the multipurpose semiconductor integrated circuit device so as to be compatible with the applications used by the multipurpose semiconductor integrated circuit device also takes a lot of time and effort. Also developing a system that can permit the user to generate firmware with no limitations and/or a framework that enables the user to develop firmware also takes a lot of time and effort, and even though it is possible to reduce the hardware cost, it is still difficult to reduce the software cost.

The multipurpose semiconductor integrated circuit device included in the present invention further includes a memory including a file storage region for storing a script file defining processes relating to data inputted and/or outputted through the plurality of types of input/output interfaces using a script language, an interpreter capable of executing the script files, and a file management system that admits accessing the file storage regions of the memory through at least one of the plurality of types of input/output interfaces. By defining processes (user logic) relating to input-output data using script files, it is possible to clearly distinguish between firmware and user logic. Accordingly, it is possible to safely open the generation, maintenance, and the like of user logic to users. Also, since it is possible to write user logic in a script language that is executed in that form by the semiconductor integrated circuit device, a compiler is unnecessary and the resources for developing user logic are minimized. In addition, it becomes extremely simple to install and change the user logic in the multipurpose semiconductor integrated circuit device.

Since the multipurpose semiconductor integrated circuit device included in the present invention includes a plurality of types of input/output interfaces, by installing a file management system and making it possible to access the file storage region of the memory from at least one of the input/output interfaces, management of the script files in the multipurpose semiconductor integrated circuit device is opened and is easily done by the users. By making one out of the plurality of types of input/output interfaces a PC interface capable of connecting to a computer terminal (PC), for example, a USB-target interface, the file management system admits accessing to the file storage region from the PC as a mass storage class (a USB mass storage class). By connecting this multipurpose semiconductor integrated circuit device and a PC via USB, makes it possible for the user to freely generate and manage script files and can also reduce the software cost.

It is also possible to provide a LAN to serial transfer function using the multipurpose semiconductor integrated circuit device. One out of the plurality of types of input/output interfaces can be a network interface that is accessed based on an address on a computer network and supports at least one network protocol that is valid for the computer network. Another one out of the plurality of types of input/output interfaces can be a serial interface that supports serial inputs/outputs and the multipurpose semiconductor integrated circuit device can include a transfer means for transferring data between the network interface and the serial interface. A LAN-serial transfer function that is used comparatively frequently can be provided by being included in the firmware.

It is also possible to store a plurality of script files in the file storage region and to further install a program management system that monitors occurrences of events, selects one out of the script files that is associated with an event that has occurred, and has the selected script file executed by the interpreter. By doing so, it is possible to execute a plurality of jobs using a single semiconductor integrated circuit device. For example, one out of the plurality of types of input/output interfaces is a network interface that can access a computer network, and a web server system that supplies at least one web output file stored in the file storage region via the network interface in accordance with HTTP protocol is installed in the semiconductor integrated circuit device. The web server system can support CGI (Common Gateway Interface) and/or SSI (Server Side Include), and the program management system that includes an event monitoring function detects CGI and/or SSI as an event and select a script file designated by the CGI and/or SSI so that the semiconductor integrated circuit device can be easily controlled from a web browser.

It is also possible to include, in a script file, a script that obtains information from at least one out of the plurality of types of input/output interfaces and executes a process that outputs the obtained information as at least part of the web output file. By doing so, it is possible to attach data obtained from a target device, for example a digital image, to a home page and view the data directly using a web browser, and it becomes no longer necessary to provide a PC for generating the home page on the target device side. If the target device is a measuring device such as a thermometer or a hygrometer, by using a multipurpose semiconductor integrated circuit device, it is possible to easily view a temperature, humidity, or other measured value that has been measured at an actual location via a network using a web browser.

When one out of the plurality of types of input/output interfaces is a network interface capable of accessing a computer network and a timer function and an SNTP client function for obtaining time information via the network interface and synchronizing the timer function are installed, it is possible to accurately manage time in the semiconductor integrated circuit device. Accordingly, a program management system including an event monitoring function can monitor time information of a timer function and select a script file based on such time information, with it being possible to freely define a process that regularly measures and stores a temperature using a script file. A PC can easily obtain a file, in which measured data is stored, via the file management system.

BRIEF DESCRIPTION OF THE DRAWINGS

FIG. 6(a) shows an example of an HTML file, FIG. 6(b) shows an example of scripts, and FIG. 6(c) shows an example of an HTML file after the scripts have been executed.

DETAILED DESCRIPTION OF EMBODIMENTS OF THE INVENTION

Figure 1:
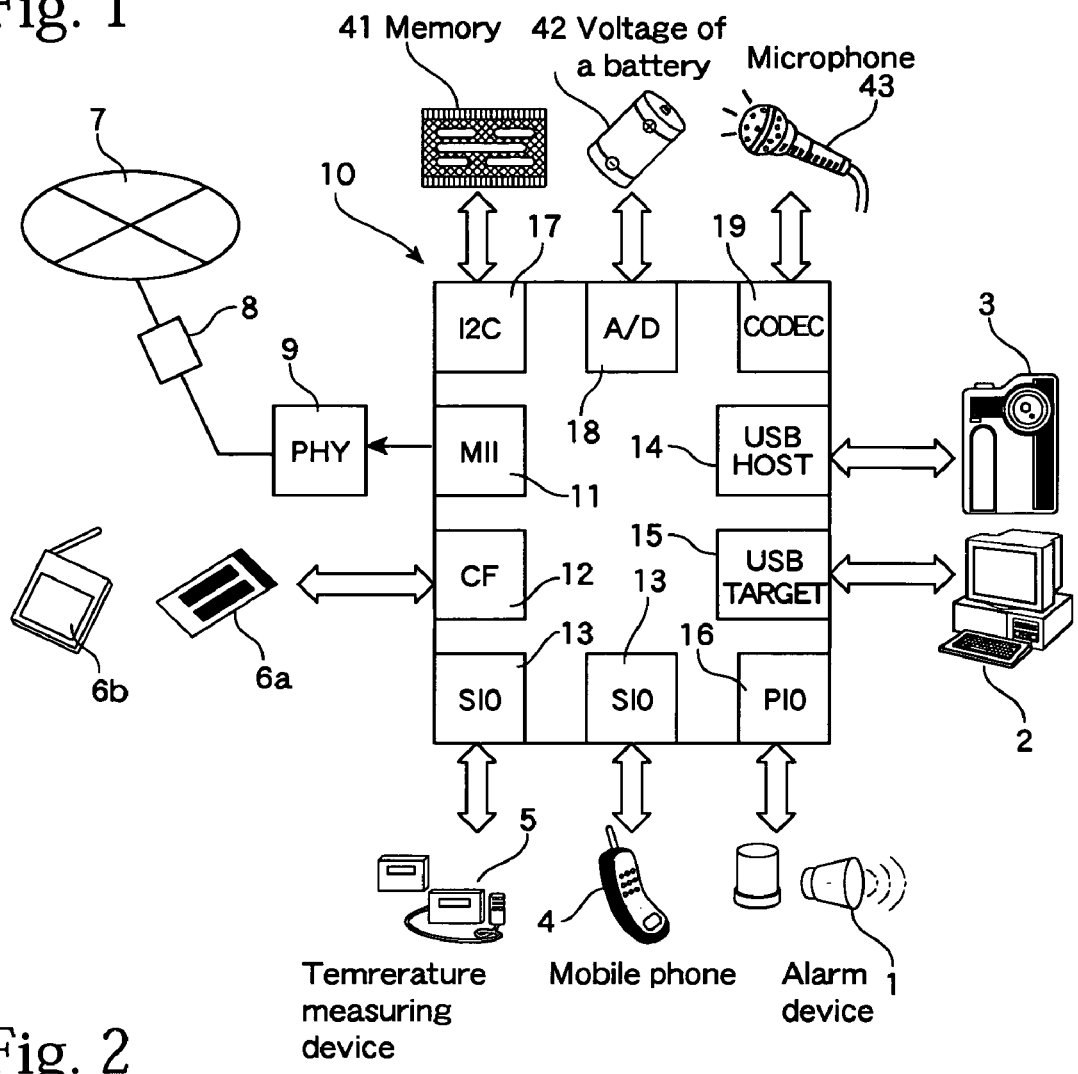
FIG. 1 shows examples of appliances and devices being connectable to a server chip.

A detailed description is presented with reference to the attached drawings. FIG. 1 shows examples of appliances that are connectable to the multipurpose semiconductor integrated circuit device included in the present invention. This multipurpose semiconductor integrated circuit device, which is called a server chip 10 hereinafter, includes many types of interfaces to which a great variety of devices can be connected as target devices. The interfaces that can be provided on the server chip 10 are not limited to the following types, but in the following description, most of the interfaces in standard use by current devices are covered by the interfaces of the server chip 10. Where not specifically indicated otherwise, the interfaces described below are equipped with a function for inputting data, for outputting data, and for inputting and outputting data. Therefore, depending on the function the user wishes to realize using the server chip 10, the server chip 10 can be used to only input data, to only output data, or to input and output data, and therefore operates as an input/output interface (input-output interface).

The server chip 10 includes an ETHERNET (registered trademark) controller 11 that is a network interface that can access a network. When a connector 9 is physically connected to the controller 11 to link the controller 11 using a LAN cable or the like via a router 8 and a TA, the server chip 10 can be connected to the Internet 7. In addition, the server chip 10 includes a CF (COMPACT FLASH (registered trademark)) interface 12 that is a card interface. Accordingly, the server chip 10 can connect to a memory card 6a, a wireless LAN card 6b, and a PHS communication card and the like and use the functions of such cards. Also, the server chip 10 includes a plurality of serial I/O interfaces 13. Accordingly, it is possible to connect to an external measuring devices, for example, a temperature measuring device 5, such as an "ONDOTORI (registered trademark) made by T&D CORPORATION, and obtain temperature data or to connect to a mobile phone 4 and a modem.

The server chip 10 also includes a USB-HOST interface 14. Accordingly, it is possible to connect to, with a USB interface, a device, such as a digital camera 3, a scanner, and a printer, and to input and output various types of data, such as image data or print data. The server chip 10 also includes a USB-TARGET interface 15. Accordingly, the server chip 10 can connect to a PC 2 and a storage region inside the server chip 10 can be accessed from the PC 2 as mass storage. The server chip 10 also includes a parallel I/O interface 16. Accordingly, it is possible to connect to an alarm device 1 and to apply the server chip 10 to outputting an alarm. The server chip 10 also includes an I²C bus interface 17 proposed by PHILLIPS. Accordingly, it is easy to connect to an external memory 41.

The server chip 10 also includes an interface 18 that has an A/D converting function and/or a D/A converting function. Accordingly, the server chip 10 can be applied to monitoring the voltage of a battery 42. The server chip 10 also includes an interface 19 with an audio CODEC function. Accordingly, the server chip 10 can be used as an IP telephone terminal that inputs audio data from a microphone 43 and outputs audio data from a speaker.

Figure 2:
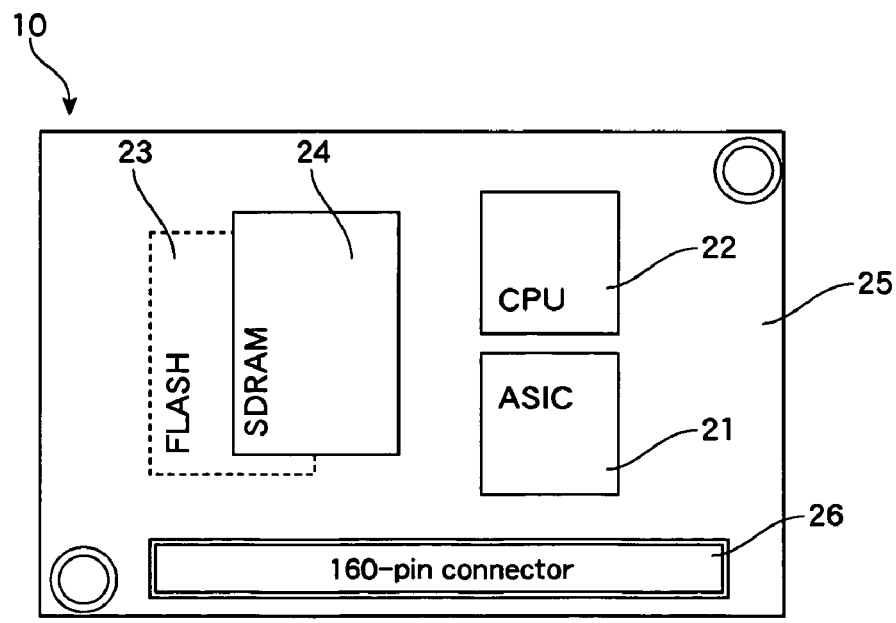
FIG. 2 shows an arrangement of modules of the server chip.

FIG. 2 shows the configuration of the server chip 10 of the present embodiment that has been modularized. The server chip 10 includes a special-purpose custom IC (ASIC) 21 in which controllers for a variety of interfaces are provided, a CPU 22, a flash memory 23 that stores data such as programs and initial settings that need to be stored in a non-volatile manner, an SDRAM 24 used as a work memory. These units 21 to 24 are respectively provided by chips, and in the server chip 10, the chips 21 to 24 are mounted on a same board 25 and integrated so as to be provided as a single module or a single chip. The server chip 10 is also provided with a 160-pin connector 26 for external inputs and outputs. In this example, a chipset composed of a plurality of chips is mounted on a single board 25 and provided as a single unit, but it is also possible to provide the server chip 10 as single chip of a system LSI that includes a controller function for various types of interface, a CPU function, a memory function, and the like on a semiconductor substrate.

Figure 3:
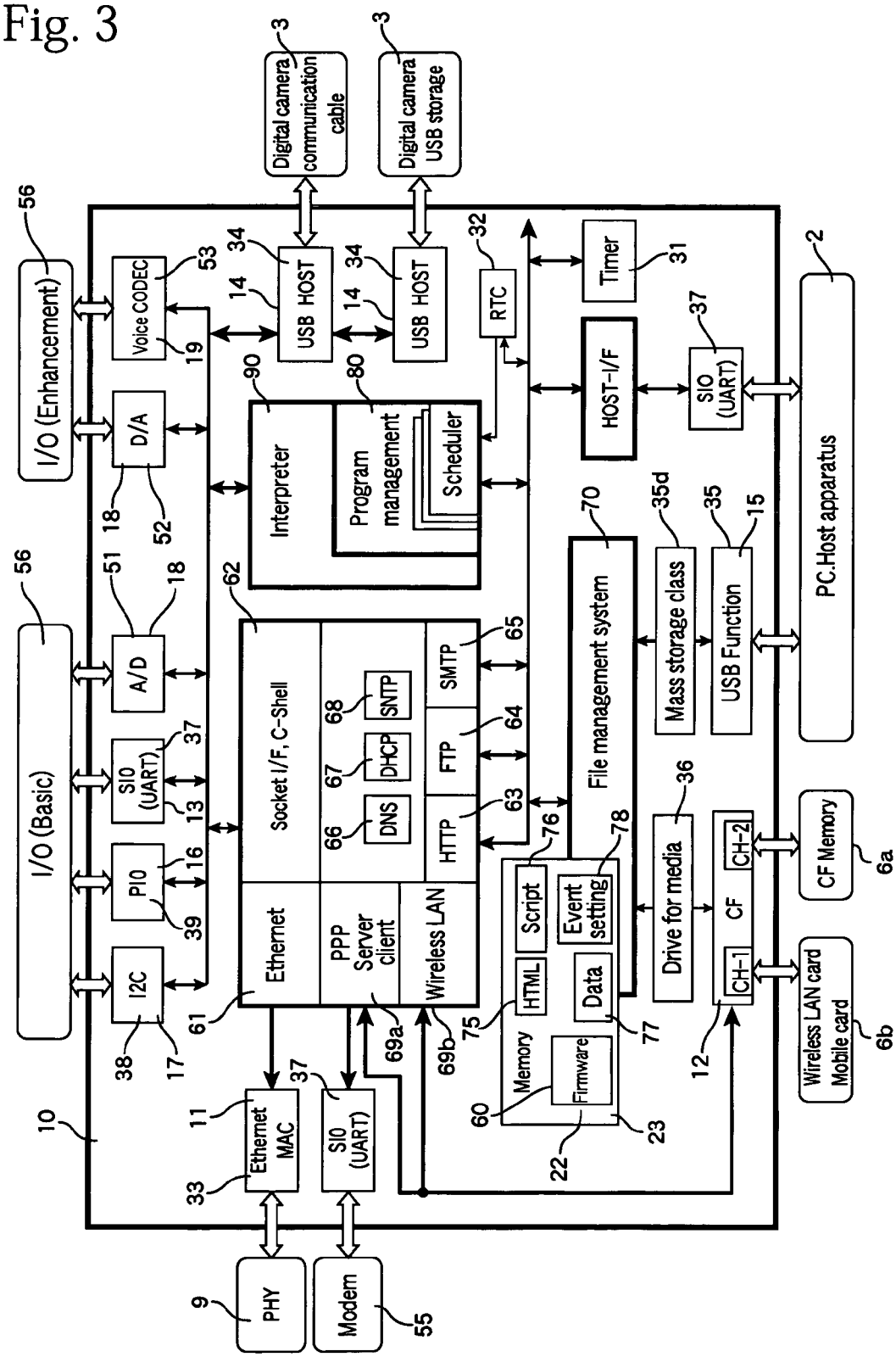
FIG. 3 is a block diagram showing the functional arrangement of the server chip.

FIG. 3 shows the functions of the server chip 10 by way of a block diagram. Some of the functions that have been illustrated as blocks can be provided by hardware, with the remaining blocks being provided by software. The server chip 10 includes, as hardware resources, but not limited to, a CPU, the memories 23 and 24, a timer 31, a clock device (RTC) 32, a network controller (MAC) 33, a USB-HOST controller 34, a USB function controller 35, and a PCMCIA controller (CF) 36. Also, as general-purpose I/O interfaces 56, the server chip 10 is equipped with an asynchronous communication device (UART) 37 as a serial interface controller that configures the serial I/O interfaces 13, an I²C controller 38 that configures the I²C bus interface 17, a parallel interface controller 39 that configures the parallel I/O interface 16, an A/D converter 51 and a D/A converter 52 that configure the interface 18 with the converting function, and a CODEC controller 53 that configures the audio CODEC interface 19. These hardware resources can be provided using the resources included in the CPU 22 and the hardware resources not installed in the CPU 22 can be included in the ASIC 21. In addition, the server chip 10 can be provide with other I/O functions as program modules that are included in the firmware 60.

The program modules are stored in the flash memory 23 and are executed by the CPU 22. ITORON is used as the fundamental OS of the server chip 10 in this embodiment. One of the important program modules that supports an I/O function is a driver (network driver) 61 of a network controller (ETHERNET (registered trademark) controller) 33 of the network interface 11. This driver 61 therefore supports TCP that is a transport layer protocol. Accordingly, in the server chip 10, the various program modules that provide services belongs to the TCP/IP protocol group, such as a socket module 62 on the session layer, operate according to TCP.

The server chip 10 also includes a program module 63 that supports an HTTP server (Web server) function that is one of the functions of the application layer in the TCP/IP protocol group. Accordingly, the server chip 10 can distribute HTML data (an HTML file) 75 freely generated by the user and stored in the flash memory 23 or the RAM 24 via a network as a web output file according to HTTP protocol. The server chip 10 can connect with an internal intranet or external Internet 7 to distribute the HTML data 75 in response to requests from a client (Web browser) that runs on a PC 2. The HTML data 75 can be stored anywhere in a file system (file management system) 70 described later of the server chip 10, and links can be freely added. In addition, it is possible to provide a file management system 70 so that folders and files for which access is not desired for security reasons are not subjected to Web distribution. The web server function 63 also supports a CGI/SSI function and can therefore generate dynamic HTML data, with this function also being described in detail later.

In addition, the server chip 10 includes a program module 64 that supports an FTP server/client function that is one of functions on the application layer. Accordingly, in cooperation with the internal file management system 70, it is possible to transmit and receive files via a network to and from an inside of the server chip 10 or an external memory device connected to the server chip 10. In addition, by providing a module 64 that supports both server and client functions, it is possible to communicate between server chips. To increase security for a modern FTP server, function of "POPbeforeFTP" is sometime required, with the server chip 10 also being equipped with a simple POP3 client function to comply with this kind of server.

In addition, the server chip 10 includes a module 66 that supports a DNS client function that is one of functions on the application layer and is used to resolve domain names. When electronic mail is transmitted by the FTP client 64 or an SMTP function 65 described later, this DNS client function 66 resolves the domain name. The DNS client function 66 can be set at primary or secondary.

The server chip 10 also includes a module 67 that supports a DHCP client function that is one of functions on the application layer. By making the DHCP client function 67 available, the setting of an IP address, subnet mask, default gateway, and the like can be automated.

The server chip 10 also includes a module 65 that supports an SMTP client function that is one of functions on the application layer. Therefore, according to a call from a script file 76 described below, it is possible to transmit electronic mail. In the SMTP client function 65, it is possible to use functions such as "From:", "To:", and "Cc:", and to attach files. Accordingly, it is also possible to transfer a data file 77 described later via electronic mail. In addition, by supporting MIME encoding (Base64), it is possible to transmit electronic mail written in Japanese. This function 65 is a client function for a mail server, and since a separate SMTP server is required to actually distribute electronic mail, a simple POP3 client function is provided in readiness for cases where it is necessary to use function of "POPbeforeSTMP" to increase security.

In addition, the server chip 10 includes a module 68 that supports an SNTP client function that obtains time information that is available on a network. Accordingly, by registering a server corresponding to SNTP, it is possible to synchronize an internal clock (RTC) 32 of the server chip 10. The RTC 32 installed in the chip 10 is not backed up with a battery, and even though the time information is lost when the power supply is turned off, the SNTP client function 68 makes an enquiry to an SNTP server on the network so that the RTC 32 can be automatically synchronized. A plurality of SNTP servers can be registered and it is possible to set the time regularly, such as once a day or once an hour. In addition, it is possible to determine whether the RTC 32 can be trusted when the power supply is turned ON according to whether the SNTP client function 68 has performed communication properly with the SNTP server.

The server chip 10 includes a plurality of other program modules aside from the TCP/IP protocol group. As a network-related module, the server chip 10 includes a module 69a that supports a PPP server/client function useful for carrying out access via a public telephone network using the modem 55. Accordingly, by using the public telephone network, it is possible to perform transmission according to a call from the server chip 10 or reception when the chip 10 is directly called. In addition, if a wireless LAN driver 69b is provided and a wireless LAN card is attached to the card interface 12, it is possible to connect to a computer network via a wireless LAN.

Although not illustrated, a driver program for driving the variety of interface modules provided by the hardware resources is installed in the server chip 10. As examples, there are the USB host interface controller 34 that composes the USB-HOST interface 14, a mass-storage driver 35d of the USB function controller 35 that composes the USB-TARGET interface 15, and the media driver 36 for the card interface. The media driver 36 includes drivers for cards connected to the card interface 12, such as a memory card and various types of modem cards. Also a driver for a serial interface, A/D and D/A drivers, and a CODEC driver are included. Although not illustrated, the server chip 10 is provided as standard with a protocol converting function for converting between the LAN (network) interface (in this embodiment, TCP/IP) 33 and the serial interface 37. When data is supplied from the LAN interface 33 to the serial interface 37, the protocol converting function transmits data received by a specified port (that can be designated) on the LAN side as it is (with only converting the protocol) to the serial side. When data is transferred from the serial interface 37 to the LAN interface 33, after converting only the protocol, the content received on the serial side is transmitted as it is to the LAN side.

The server chip 10 includes a file management system 70. This file management system 70 can manage storage regions that physically include the flash memory 23 and SDRAM 24 that supply the program area and data area, and the storage regions include also a CF memory that can be connected to the card interface 12, and a USB memory (mass storage-class device) that can be connected to the USB host controller interface 34 as internal storage regions (internal file regions). The file management system 70 admits accessing the internal file regions using or through the FTP function 64 and the USB target interface 35. Inputs and outputs for these file regions can be made by a script file 76 stored in the same file regions.

Figure 4:
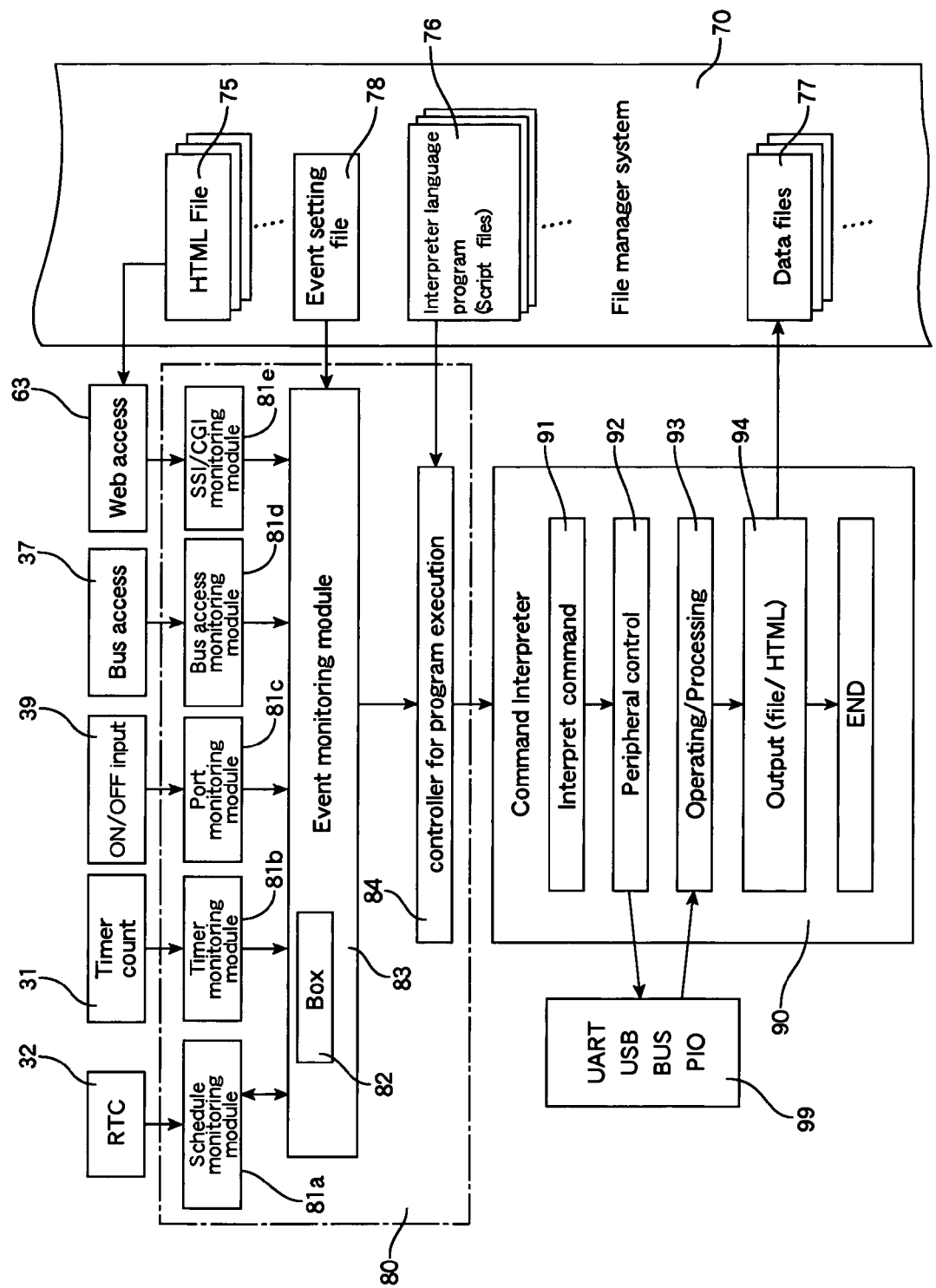
FIG. 4 is a diagram for explaining the functions of a command interpreter.

In addition, the server chip 10 includes a program management function 80 that selects a script file 76 from the memory regions (file storage regions) managed by the file management system 70 and a command interpreter function 90 that executes the selected script file 76. These functions will now be described with reference to FIG. 4.

The program management function 80 includes monitoring modules 81a to 81e that detect the occurrence of events with respectively specified trigger conditions, an event monitoring system 83 that constantly refers to event messages posted from the monitoring modules 81a to 81e to an event message box 82 and specifies a script file 76 associated with an event message based on an event setting file 78, and a program execution controller 84 that sends the specified script file 76 into a local table and activates a command interpreter 90 with a first address in the table as a parameter.

A schedule monitoring module 81a generates an event with time information supplied from the RTC 32 as a trigger. It is possible to designate an event using time information for every second, every minute, every hour, a date, or the like, and to input/output data from/to a target device connected to any of the interfaces. For example, it is easy to set a process that regularly obtains a temperature from the temperature measuring device 5 connected to the serial interface 37 and accumulates temperature values in a data file 77.

The timer monitoring module 81b generates an event at specified intervals according to the timer 31. The port monitoring module 81c generates an event when a level of a specified port of the parallel interface 39 changes to a designated direction (from high to low, or from low to high). Also, an event can be generated according to a condition such as when the number of pulses in a designated time period is high or low. The bus access monitoring module 81d generates an event when a specified number of bytes have been received by serial communication by the serial interface 37 that performs bus access, and therefore processes such as the decoding or transferring of the received serial data can be carried out. The SSI/CGI monitoring module 81e causes an event to occur according to tags for activating CGI or SSI included in the HTML file 75 to be transmitted by the web server function (HTTP) 63. CGI (Common Gateway Interface) is a standard for an interface that has external programs run from the web server function (HTTPd or WWW server) 63. In the present embodiment, the SSI/CGI monitoring module 81e is a means used to allow the WWW browser 2a of the user's PC 2 to cause the server chip 10 to perform an action, with one of such actions being the activation of a designated script file 76. SSI (Server Side Include) is one of command executing functions of the web server function 63. In the present embodiment, when HTML data 75 is transmitted from the server chip 10, it is possible to activate a designated script file 76 and to transmit the data to the user's PC 2 including the result of such activation.

The command interpreter 90 interprets a command or script included in the selected script file 76 and carries out operations and processing using various types of program modules and hardware modules installed in the server chip 10. The interpreter 90 is a program that can execute instruction statements (scripts) of a program expressed using a high-level language that is understandable to the user in its present state, and by directly viewing, editing and generating a script file 76, the user can set the application to be executed by the interpreter 90. Examples of such script include JAVASCRIPT (JAVA is a registered trademark) and Perl, and it is possible to designate the inputting and outputting of data via various types of interface using instructions of a compact functional form.

The command interpreter 90 first interprets a command (step 91), controls a designated peripheral appliance and devices (step 92), carries out arithmetic and/or logical processing of data or information obtained from one of the various types of interfaces 99 installed in the server chip 10 (step 93), and outputs a data file 77 or HTML 75 (step 94). Accordingly, in the server chip 10, various processes dependent on the occurrence of respective events can be predefined using a script file 76 that can be understood in its present form and generated by the user. Accordingly, a framework including a compiler is not required, and since the script files 76 can be managed by a general-purpose file management system 70, the script files 76 can be easily changed by access from any of the interfaces 99. For example, the file management system 70 admits accessing as a mass storage class from the PC 2 via the USB function 35. In addition, by using the file management system 70, it is possible to control the files that are available to the user, with it being possible to allow the user to handle the script files 76, the HTML files 75, the event setting files 78, and the data files 77 without exposing the firmware 60 to the user. As a result, it is possible for the user to define the functions of the server chip 10 safely and extremely easily.

The file management system 70 makes it possible to handle the respective files 75 to 78 described above as USB mass-storage classes. For this reason, by connecting the server chip 10 to the PC 2 via the USB function 35 and installing an editor function in the PC 2, it is possible to edit and generate the script files 76 extremely easily. A compiler and other framework programs are completely unnecessary. Since the file management system 70 also makes it possible to handle the files 75 to 78 using the FTP function 64, it is possible to easily access a server chip 10 installed in a remote location via the Internet 7 and carry out tasks such as updating the script files 76. By using an access restricting function of the file management system 70 achieved using passwords or the like, the security and soundness of the script files 76 can be maintained.

A large characteristic of the server chip 10 is the ability to distribute HTML data 75 using the HTTP server function 63 and at that time to execute the command script 76 using the SSI/CGI function 81e. The command script 76 can be consecutively executed by the interpreter 90 of the server chip 10, and therefore HTML data can be dynamically generated and information obtained from a target device connected to one of the interfaces 99 can be supplied to the outside via the Internet as the HTML data 75.

Figure 5:
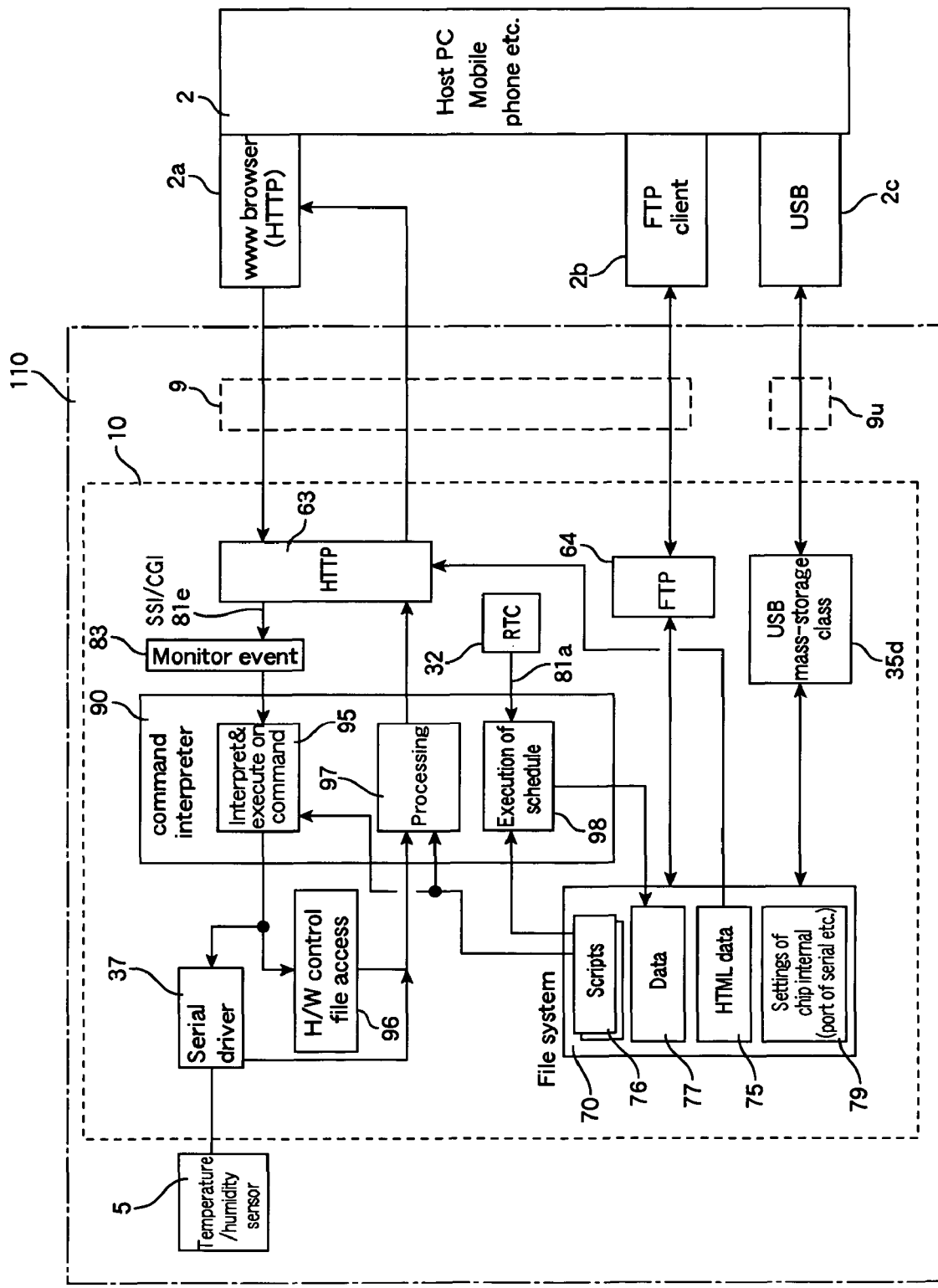
FIG. 5 is a diagram for explaining the functions of an HTTP server.

An overview of this is shown in FIG. 5. When the server chip 10 is accessed using HTTP protocol from the WWW browser 2a of the PC 2 that is a client for the server chip 10, the HTTP server function 63 of the server chip 10 supplies the HTML data 75 stored in the file management system 70. At this time, when CGI is defined in the HTML file 75, an event is generated by the SSI/CGI monitoring module 81e and such event is detected by the event monitoring system 83 and the script file 76 designated by the CGI or SSI is executed by the interpreter 90. As a result, a process 96 such as hardware control, file access and/or obtaining data that is defined by the script file 76 is executed and next process 97 that further processes the obtained data is executed by the interpreter 90. When the script file 76 selected by the CGI includes an instruction to obtain temperature and humidity and output them using an HTML file, temperature data and humidity data are obtained via the serial interface 37 from the temperature/humidity sensor (temperature/humidity measuring device) 5 and are processed by the interpreter 90 to output HTML data and supplied by an HTTP server function 63 to the WWW browser 2a of the client.

Figure 7:
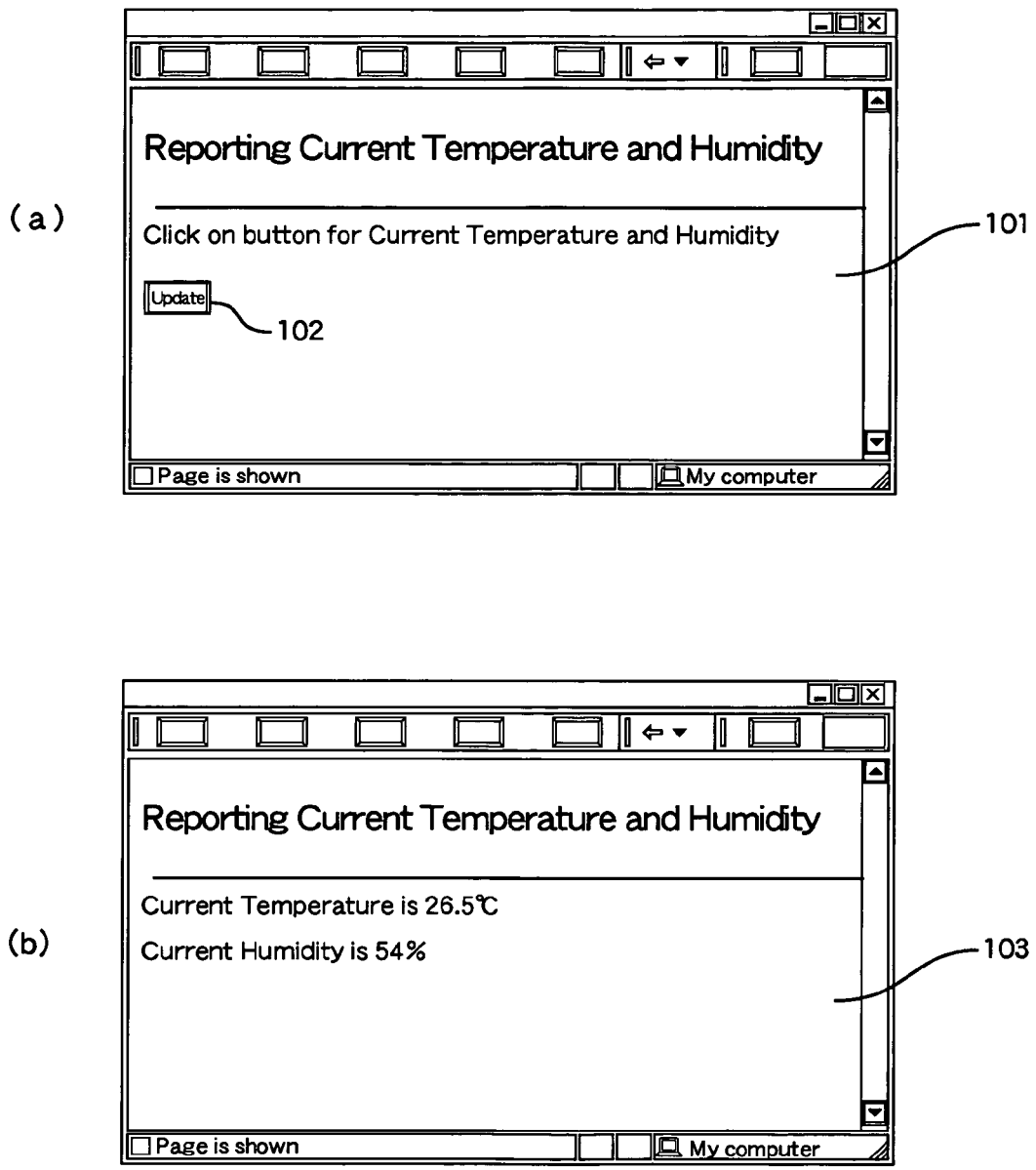
FIG. 7(a) and FIG. 7(b) show output examples of HTML files.

FIG. 6(a) shows one example of an HTML file 75, and when this file is supplied by the HTTP server 63 to the browser 2*a* of the client, the page 101 shown in FIG. 7(*a*) is outputted. When the user clicks a button 102 on the page 101, according to "ondo.cgi" registered in the HTML file 75, a script file 76 in which scripts such as those shown in FIG. 6(*b*) are written is executed by the interpreter 90. The functions "get_ondo( )" and "get_situdo( )" are written in this script file 76 and by calling such functions, the temperature and humidity are fetched from the serial interface 37 so that the current temperature and humidity at that time can be respectively set in variables called "$temp" and "$hmdt". An instruction for generating the HTML data 75*a* shown in FIG. 6(*c*) for outputting the temperature and humidity using such variables can also be written in the script file 76, so that the HTML data 75*a* including the temperature and humidity are supplied from the HTTP server 63 to the browser 2*a* of the client. As a result, a page 103 such as that shown in FIG. 7(*b*) is displayed by the browser 2*a* of the client.

In addition, as shown in FIG. 5, according to the script file 76, the server chip 10 can easily execute a process that obtains, based on time information supplied from the RTC 32 and according to a schedule, data from the temperature/humidity measuring sensor 5 that is a target device and accumulates the data in a data file 77 in the file management system 70. The data accumulated in the data file 77 in the file management system 70 can then be easily obtained using the FTP client function 2*b* of the PC2 according to the FTP function 64. The data accumulated in the data file 77 can also be easily obtained using the USB function 2*c* of the PC2 according to the USB mass-storage class 35*d*. Other files such as a chip internal settings file 79 are the same.

In this way, the server chip 10 functions as a device server that has the temperature/humidity sensor 5 as a target device. For this reason, it is possible to connect the temperature/humidity sensor 5 to a computer network and easily obtain temperature and humidity values via the network from the browser of a client. Data such as the temperature and humidity can be obtained as instantaneous data when access is performed or can be obtained as data that is regularly measured and accumulated in the server chip 10.

To physically connect the server chip 10 to the PC 2, a connector 9 that can connect a LAN cable or a connector for connecting a USB cable is required, and by assembling the temperature/humidity sensor 5 and the server chip 10 including such connectors 9, it is possible to provide a temperature/humidity measuring device 110 including a network connecting function.

In the field of embedding functions into device servers, implementing of HTTP and FTP requires to clear some hurdles such as turning between peripheral controls and target devices, an extremely long time is required to produce the entire firmware of a device server. Even if an HTTP or FTP protocol stack is purchased as a library, such library will not be cheap. Accordingly, in response to the demand to make a company's peripheral devices or general-purpose peripheral devices (such as a digital camera) accessible on the Internet, companies have hitherto internally developed their own products, or purchased special-purpose modules for such appliances from third-party vendors with ordering development. The server chip 10 according to the present embodiment uses an arrangement where parts of functions relating to HTTP/FTP and peripheral control are given wide applicability and only the user-unique parts of functions are developed in a user-friendly, low-cost way using the script files 76. These script files 76 can be freely rewritten by the user and are stored in a special area for executing scripts (a specified directory in the internal file management system 70). Although a method where the firmware itself was updated and rewritten in the flash memory has the risk of system breakdown due to the effects of such rewriting on other modules or rewriting errors, by using script files 76 that are placed under the control of the file management system 70, such risk can be minimized and it also becomes possible to access the data using the FTP function 64 or to easily access the data as the USB mass storage class 35*d*.

In addition, the scripts are not limited to functions that obtain the temperature and humidity in the form of "get_ondo( )" and "get_situdo( )" described above, and it is possible to provide functions that define different processes such as "ondo_log_start( )" and "ondo_log_end( )" that indicate the start and end of recording. Relating to other devices, by providing functions for unique processes for each target device such as obtaining USB camera images or transmitting electronic mail, it is possible for the user to control the target devices connected to the server chip 10 extremely easily.

The server chip 10 that is compact and has a variety of interfaces for a variety of network functions has a great number of applications. In particular, by introducing IPv6, IP addresses become almost limitless and by combining the server chip 10 and a variety of devices, it is possible to easily and inexpensively construct a great variety of systems that use a network. For example, it is possible to attach the server chip 10 to an entry/exit sensor and count the number of entrants at an event venue or the like and to verify the current state via a network from a web browser 2*a*. As other examples, it is possible to manage the opening and closing of a refrigerator door or temperature and/or humidity of the refrigerator, to manage the state of ice, to obtain recipes for a microwave oven from a network, to automatically set the mode of a microwave oven in accordance with the intended use, to obtain a TV program, to set the recording timer of a video recorder, to view images taken by a digital camera from a remote location, or to obtain a temperature inside a room via a network in order to control an air conditioner. In such applications, by combining existing hardware resources with the server chip 10, such devices can be easily converted to network devices. In addition, in the field of home security, by combining the server chip 10 with a sensor for the state of a lock, a door open/closed sensor, a window open/closed sensor, a human detecting sensor, or the like, a system for remote monitoring can be easily constructed. It is also extremely simple to manage product information for a vending machine via a network, and by combining storage with the server chip 10, it is extremely simple to install a shared storage device on a network.

As described above, the multipurpose semiconductor integrated circuit device included in the present invention includes a memory with file storage regions storing script files where processes relating to data inputted and/or outputted by a plurality of types of input/output interfaces are defined using a script language, an interpreter that can execute the script files, and a file management system that makes it possible to access the file storage regions from at least one of the plurality of types of input/output interfaces. Accordingly, it is possible to make full use of the merits of script files composed of high-level language that can be understood in their present state by the user and easily changed and generated, and for the user to generate and maintain logic safely and at low cost. For this reason, by using the multipurpose semiconductor integrated circuit device according to the present invention, it is possible to provide the market with network compliant devices using existing hardware resources in a short time and at low cost.

The invention claimed is:

1. A multipurpose semiconductor integrated circuit device comprising:

a plurality of types of input/output interfaces;

a non-volatile memory including a file storage region for storing a script file and firmware in a non-volatile manner, the firmware including program modules for functioning of an application layer, the script file defining, using a script language, processes relating to data input and/or output through the plurality of types of input/output interfaces with the program modules;

an interpreter being configured to execute only commands of the script file relating to the input and/or output of data through the plurality of types of input/output interfaces with the program modules, and to execute processes of inputting data and outputting data through the plurality of types of input/output interfaces with the program modules; and a file management system that admits access to the file storage region of the non-volatile memory through at least one of the plurality of types of input/output interfaces, the file management system being configured to allow a user to manipulate the script file stored in the file storage region in an exposed state without exposing the firmware stored in the file storage region, wherein a plurality of script files are stored in the file storage region, one of the plurality of types of input/output interfaces is a network interface that admits accessing a computer network, and the multipurpose semiconductor integrated circuit device further comprises:

a program management system that monitors occurrences of events, selects one of the plurality of script files that is associated with an event that has occurred, and causes a selected script file to be executed by the interpreter; and a web server system that supplies at least one web output file stored in the file storage region via the network interface in accordance with Hypertext Transfer Protocol (HTTP), the web server system supporting Common Gateway Interface (CGI) and/or Server Side Include (SSI), the program management system selecting a script file designated using CGI and/or SSI, and the script file including a script for executing a process that obtains information from at least one of the plurality of types of input/output interfaces and outputs the obtained information as at least part of the web output file.

2. The multipurpose semiconductor integrated circuit device according to claim 1, wherein the network interface is accessed based on an address on a computer network and supports at least one network protocol that is valid for the computer network, another one of the plurality of types of input/output interfaces is a serial interface that supports serial input/outputs, and the multipurpose semiconductor integrated circuit device further comprises a transfer means for transferring data between the network interface and the serial interface.

3. The multipurpose semiconductor integrated circuit device according to claim 1, wherein one of the plurality of types of input/output interfaces is a personal computer (PC) interface for connecting to a computer terminal, and the file management system admits the computer terminal to access the file storage region as a mass storage class via the PC interface.

4. The multipurpose semiconductor integrated circuit device according to claim 1, wherein the multipurpose semiconductor integrated circuit device further comprises a timer function and a Simple Network Time Protocol (SNTP) client function for obtaining time information via the network interface and synchronizing the timer function, and the program management system selects one of the plurality of script files based on time information of the timer function.

5. A device server comprising a multipurpose semiconductor integrated circuit device according to claim 1, and a connector connected to one of the plurality of types of input/output interfaces.

6. A device comprising:

a multipurpose semiconductor integrated circuit device according to claim 1;

a target device connected to one of the plurality of types of input/output interfaces; and a connector connected to another one of the plurality of types of input/output interfaces.

7. The multipurpose semiconductor integrated circuit device according to claim 1, wherein the non-volatile memory device is a flash memory.

8. The multipurpose semiconductor integrated circuit device according to claim 1, wherein the file management system is configured to provide, to the user, open generation and access to the script file for at least one of updating of the script file and maintenance of user logic.

* * * * *